Aug. 20, 1929.  W. R. MATTHEWS  1,725,290
ANTIFRICTION SHAFT AND BEARING
Filed Jan. 5, 1926
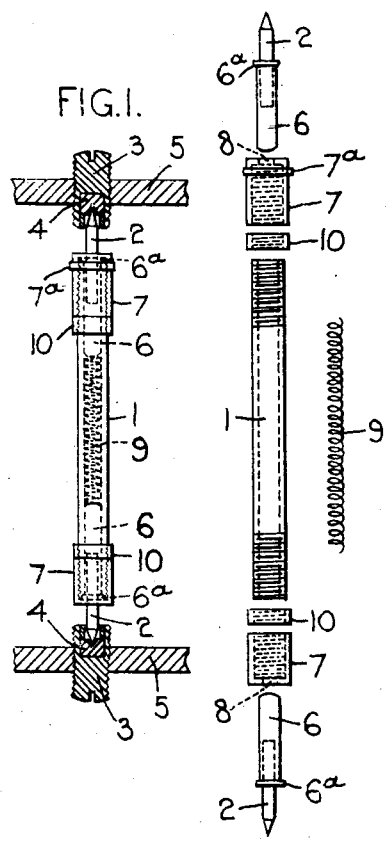
INVENTOR
Walter Richard Matthews
BY Lyman E. Dodge
ATTORNEY Patented Aug. 20, 1929.

1,725,290

UNITED STATES PATENT OFFICE.

WALTER RICHARD MATTHEWS, OF WILLESDEN, LONDON, ENGLAND.

ANTIFRICTION SHAFT AND BEARING.

Application filed January 5, 1926, Serial No. 79,393, and in Great Britain June 4, 1925.

This invention relates to antifriction shafts and bearings for supporting the principal moving parts of electric measuring instruments and other similar instruments. The moving parts of such instruments require to be supported by pointed pivots mounted in hard jewel bearings, with as little friction as possible, and so that the instrument will not be damaged when subjected to rough usage, knocks or jars.

This invention consists in the novel construction and combination of the parts hereinafter fully described and claimed, by means of which the pivots of the shaft are retained in their bearings under a predetermined and adjusted pressure.

In the drawings, Fig. 1 is a side view of a shaft and its bearings partially in section, and constructed according to this invention. Fig. 2 is a side view showing the various parts of the shaft when separated from each other.

1 is the spindle of an electric measuring instrument of the type in which a soft iron plate or armature (not shown) is attached to the spindle in the usual or any appropriate manner, 2 are longitudinally movable pivots or pivot pins at the opposite ends of and carried by the spindle 1, and 3 are the holders or cups in which the hard jewel bearings 4 are held in fixed position. 5 represents portions of bridge-bars, brackets or plates (which may as usual form parts of the frame of the instrument, or may be attached thereto) into holes in which the jewel cups 3 are screwed in the usual manner the jewel cups being thus adjustable relative to the points of the pivot pins 2.

As clearly shown in Fig. 2 the pivot pins 2 extend, with a sliding fit, into metal,— preferably brass,—sockets or holders 6. Each socket 6 has a collar 6ª on its outer end. As shown in Fig. 1 the socket 6 carrying the pin 2 is inserted in the bore of the spindle 1 which is a tube or tubular piece of metal, the socket 6 being a nice sliding fit in the bore of the spindle 1 in which the said socket can move or slide longitudinally. The spindle 1 is screw-threaded externally throughout its length, and sockets 6 with the pivot pins 2 therein are secured to the spindle 1 by means of screw caps 7 screwed up on the spindle, these screw caps being closed at their outer ends with the exception of a small hole 8 (Fig. 2) through which the outer end portions of the pivot pins 2 project. Between the inner ends of the brass sockets or holders 6 in which the pivot pins are carried a coiled spring 9 is provided within the bore of the tubular spindle or shaft 1, the said spring being, of course, inserted within the bore of the spindle before both pivot pin holders or sockets 6 are inserted in the ends of the spindle. The pivot pin holders or sockets 6 having been inserted in the ends of the spindle the above mentioned screw caps 7 may then be screwed up and adjusted to retain the said pivot pin holders in any desired position, the spring 9 within the bore of the spindle being thus compressed to an appropriate extent between the inner ends of the pivot pin holders or sockets 6 at opposite ends of the spindle so that the said spring is constantly pressing the pivot holders 6 and the pivot pins 2 outwardly. The shoulders on the outer ends of the caps 7 press the pivots and pivot holders inwardly against the spring. The caps are screwed up so that the pivot points bear on the jewels of the bearings with a predetermined pressure, so that the pivots will work with as little friction as possible, and so that they will not easily be displaced by rough usage.

10 are internally screwed collars which are screwed on to the screw thread on the tubular spindle 1 before the end caps 7 are applied thereto, and when the said screw caps 7 have been screwed up on the spindle 1, to hold the sockets in their adjusted position, the screw collars 10 may be screwed back on the spindle into contact with the inner ends of the screw caps 7 the collars 10 thus serving as jam nuts.

The screw cap 7 by which the pivot socket 6 at the upper end of the spindle or shaft 1 is held thereto is preferably somewhat longer than the screw cap for the other or lower end of the spindle, and this upper screw cap 7 is provided with an annular collar or flange 7ª near its upper end to which the usual or appropriate pointer, through which the indications are to be given, is attached.

What I claim is:—

1. The combination, with stationary but adjustable pivot bearings, of a shaft having a tubular end portion, a pivot holder slidable in the said end portion, a spring pressing the pivot holder outwardly in the said end portion, a pivot of smaller diameter than the said pivot holder, said pivot being secured in the pivot holder and engaging with one of the pivot bearings, an adjustable cap mounted on the said shaft the said cap serving for regulating the pressure of the spring on the pivot and for preventing the said pressure acting on the bearing, and a pivot projecting at the other end of the said shaft and engaging with the other pivot bearing.

2. The combination, with stationary pivot bearings, of a shaft having externally screw-threaded tubular end portions, spring-pressed pivot holders slidable in the said tubular end portions, pivots of smaller diameter than the pivot holders, said pivots being secured in the pivot holders and engaging with the pivot bearings, and adjustable caps screwed on the said tubular end portions and engaging with the pivot holders and pivots and operating to regulate the pressure of the pivots on their bearings.

3. The combination, with stationary pivot bearings, of a shaft having a tubular end portion, a pivot slidable in the said end portion, a spring pressing the pivot outwardly in the said end portion and towards one of the said bearings, an adjustable cap mounted on the said end portion the said cap serving to retain the pivot in the said end portion, to regulate the pressure of the spring on the pivot and to prevent the said pressure acting on the bearing, and a pivot projecting at the other end of the said shaft and engaging with the other bearings.

4. Pivot bearings and a shaft mounted therein as set forth in claim 3, the said shaft being tubular throughout, and enclosing a single spring extending between the inner ends of the pivot holders.

In testimony whereof I affix my signature.

WALTER RICHARD MATTHEWS.